(12) United States Patent
Dubé et al.

(10) Patent No.: US 6,836,364 B2
(45) Date of Patent: Dec. 28, 2004

(54) BEAM STEERING AND SCANNING DEVICE

(75) Inventors: George Dubé, Chesterfield, MO (US); Samuel W. Bross, Palmyra, MO (US)

(73) Assignee: MetaStable Instruments, Inc., St. Charles, MO (US)

( * ) Notice: Subject to any disclaimer, the term of this patent is extended or adjusted under 35 U.S.C. 154(b) by 133 days.

(21) Appl. No.: 10/389,199

(22) Filed: Mar. 14, 2003

(65) Prior Publication Data

US 2004/0036934 A1 Feb. 26, 2004

Related U.S. Application Data

(60) Provisional application No. 60/364,574, filed on Mar. 18, 2002.

(51) Int. Cl.[7] .............................................. G02B 27/64
(52) U.S. Cl. ..................... 359/554; 359/557; 359/196; 359/209; 359/210; 359/211; 359/832
(58) Field of Search ................................ 359/196, 197, 359/209–211, 832, 554, 557; 362/269

(56) References Cited

U.S. PATENT DOCUMENTS 4,614,405 A * 9/1986 Brandenberg et al. ...... 359/832
6,243,132 B1 * 6/2001 Lee et al. ............... 348/208.11
6,674,954 B2 * 1/2004 Baba et al. .................. 359/196

* cited by examiner

Primary Examiner—Drew A. Dunn
Assistant Examiner—Joshua L Pritchett
(74) Attorney, Agent, or Firm—Polster, Lieder, Woodruff & Lucchesi, L.C.

(57) ABSTRACT

A beam steerer/scanner (50) includes a dynamically balanced bi-index rotating element (52). The element is comprised of a pair (52A, 52B) of transparent hemispheres which are of the same size and shape, are made from two materials of equal density, but which materials have different refractive indices (n). When the element is oscillated or rotated, an incident beam (L) impinging upon the element through a coupling lens (56) is deviated from its initial path and a deviated beam (T) is emitted from the element through another coupling lens (58). Because the two materials forming the hemispheres are of equal density, the resulting assembly may be oscillated or rotated at very high speeds without causing excessive vibration or stress. The steerer/scanner provides a high (>0.95) throughput and scanning rates as high as 1 kHz are possible. A two-dimensional scanning unit can also be constructed using the same components as used to produce a one-dimensional scanner.

18 Claims, 2 Drawing Sheets

BEAM STEERING AND SCANNING DEVICE

CROSS REFERENCE TO RELATED APPLICATIONS

Provisional patent application No. 60/364,574 filed Mar. 18, 2002.

STATEMENT REGARDING FEDERALLY SPONSORED RESEARCH OR DEVELOPMENT

A portion of the research and development work involved in this invention was funded by the United States Army Space & Missile Defense Command.

BACKGROUND OF THE INVENTION

This invention relates to devices and methods for scanning beams of electromagnetic radiation, including beams of light and laser beams.

Precise and timely control of the direction of a laser or light beam is critical in many applications. In missile defense, these include the activities of searching for and identifying missiles, missile targeting and tracking, and rangefinding, aiming, and target imaging. In industrial applications, these applications include nano-fabrication, integrated circuit (IC) fabrication and repair, graphic displays, and laser material processing.

In-line, refractive or drop-in, beam scanners provide a compact, light weight, large clear aperture, and a rugged optical system compared with reflective scanners which require rerouting or "dog-legging" of a laser beam to direct the beam into and out of a reflective scanner. Scanners having a large clear aperture that are also lighter and faster than existing scanners will improve the performance of laser radars, laser range finders, graphic display systems, imaging systems and any system employing laser beam scanners.

Most conventional beam steering/scanning devices use mirrors, which are well suited to making large (~180°) changes in the direction of polychromatic beams. However, it takes at least two mirrors to effect a minor change in the direction of the light beam, and at least three mirrors if the pivot point or center-of-scan of the beam is to remains on the original beam axis. At least one of the three mirrors must also be mounted off-axis. This adds to the size of the device, increases its weight and cost, and makes it inconvenient to use. If the laser beam is monochromatic, as most laser beams are, and if the desired deviation is no more than +/-30° about a nominal beam direction, refractive beam steerers and scanners provide a number of advantages.

In many applications it is desirable to deviate the direction of a light beam rapidly and repetitively. Common prior art methods employ galvanometer drives to oscillate low moment of inertia mirrors about one axis, or to spin polygonal mirrors about a single axis. All mirror-based techniques produce a major deviation of the incident beam; yet, it is often desirable to produce a beam scanning motion without changing the basic direction of the beam. As described hereinafter, the present invention provides a device that can be inserted into the path of a light beam to scan the transmitted light beam over a range that remains centered on the original beam axis. The device can be retrofitted to existing optical systems without the need to reroute or redirect the beam.

Several types of refractive beam steerers already exist, including moving lenses, matched-lens adjustable (aka. lubricated adjustable optical) wedges, and rotating Risley Wedges. However, none of these prior art devices are capable of high scanning rates. One reason for this is that the moving components of these devices are not symmetric about an axis of rotation, and/or, they have relatively large moments of inertial which make rapid movements impractical because of the resultant high stresses, flexing and vibrations.

Referring to FIG. 1, an in-line refractive beam steerer/scanner, commonly referred to as a Risley Wedge Scanner or diasporometer is shown. The scanner uses two thin prisms or optical wedges W1, W2 which are in parallel with each other. In this device each prism is separately rotatable about the axis of an incoming beam B. Rotating wedge W1 sweeps an incident beam B around in a cone shaped pattern whose apex is on the original beam axis. In FIG. 1, the deviation of beam B to its original path, after having passed through wedge W1, is given as $\delta_1$. Rotating wedge W2 allows the beam to be positioned anywhere within a cone angle that is approximately double that of a single wedge. The deviation of beam B, having passed through wedge W2, is given as $\delta_1+\delta_2$. If the two wedge angles are not exactly equal, then $\delta_1 \neq \delta_2$, and the wedges cannot return the beam to its original (undeviated) path. Further, even if the two wedges are exactly the same, the relationship between the resulting deviation and the position of the wedges is complicated by the fact that the deviation depends upon both wedge angle and angle of incidence. Rotating wedge W1 alters the angle of incidence on wedge W2 so the deviation produced by wedge W2 is generally not the same as that produced by wedge W1. This is why counter-rotated wedges do not produce a straight line scan pattern, but rather a "bow-tie" pattern instead.

Recently, a lubricated adjustable optical wedge (LAOW) has been introduced which overcomes blind spots, and the nonlinear and non-orthogonal behavior of Risley wedges. However, LAOW's have heretofore not been able to achieve the high scanning speeds of Risley wedges. The present invention combines the optical function of a beam steering wedge in a device mechanically symmetric about an axis of rotation and therefore capable of high rotational speeds without producing excessively high stress, distortion or vibration.

BRIEF SUMMARY OF THE INVENTION

Briefly stated, a beam steerer/scanner of the present invention utilizes two identically formed sections of transparent hemispheres (or hemi-cylinders or circular wedges) which are of the same size and shape, are made from two materials of equal density, but which materials have different refractive indices. The two pieces are joined together to form a dynamically balanced bi-index rotating element. When the element is oscillated or rotated, a transmitted beam impinging upon the element is deviated from its initial transmission path. Because the two materials are of equal density, the resulting assembly may be oscillated or rotated at very high speeds (6000 rpm) without causing excessive vibration or stress. The steerer/scanner provides a high (>0.95) throughput and scanning rates as high as 1 kHz are possible. A two-dimensional scanning unit can also be constructed using the same components as used to produce a one-dimensional scanner.

The steerer/scanner has an in-line, drop-in, design that saves space, weight and cost in a unit, while providing large clear apertures in constrained spaces such as missile domes. Finally, the steerer/scanner is especially effective in the infrared portion of the spectrum, where high refractive index materials are common.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings, which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what the present inventors believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
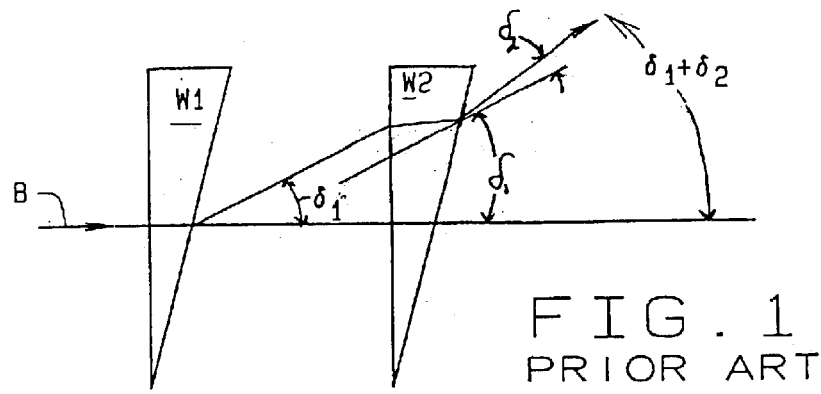
FIG. 1 is a simplified representation of a prior art beam steering device comprising two rotating Risley Wedges.
Figure 2:
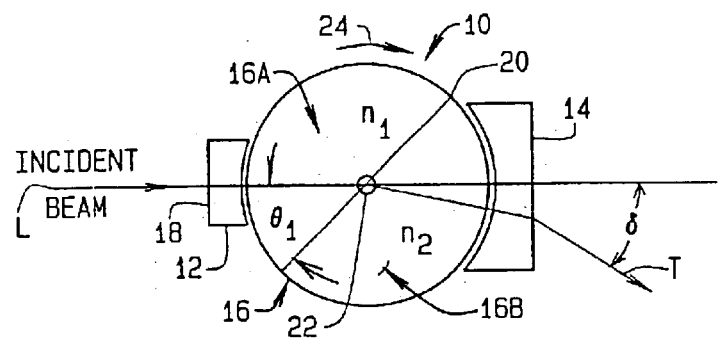
FIG. 2 is a representation of a first embodiment of a beam scanner of the present invention employing half cylinders or hemispheres.

Referring to the drawings, a first embodiment of the present invention is shown in FIG. 2 and is indicated generally 10. In FIG. 2, two coupling lenses 12 and 14 are positioned on opposite sides of a right circular cylinder or sphere indicated generally 16. Cylinder or sphere 16 is a movable (rotating or oscillating) optical component comprised of two identically formed, opposed sections 16A and 16B. Cylinder or sphere 16 is installed in a frame (not shown) so it can be rotated about a central axis 22. The two cylinder or sphere halves are constructed of transmitting materials with refractive indices $n_1$ and $n_2$ respectively. An incident beam L of light (or other electromagnetic radiation) enters from the left of FIG. 2 traveling in the direction indicated by the arrow. Beam L first encounters a flat surface 18 of coupling lens 12, then enters the left hand half-cylinder or sphere portion 16A of cylinder or sphere 16. The beam is then transmitted through and in general refracted at interface 20, formed by the adjoining faces of the two cylinder or sphere portions, passes through cylinder or sphere portion 16B, and exits the device through coupling lens 14 as a transmitted beam T. A deviation angle δ is now determined by the angle of incidence the beam makes with the interface between the two cylinder or sphere halves. When the angle of incidence is zero, the deviation is zero for any two refractive indices. At other angles of incidence, Snell's Law determines the deviation produced by the device. This angle of incidence is varied by rotating or oscillating cylinder or sphere 16 about its own axis 22, as indicated by arrow 24. If the densities of the two half cylinders are equal (or nearly equal), the combined cylinder may be rotated or oscillated about its axis at high speeds without creating excessive vibrations, stress or distortion.

Figure 3:
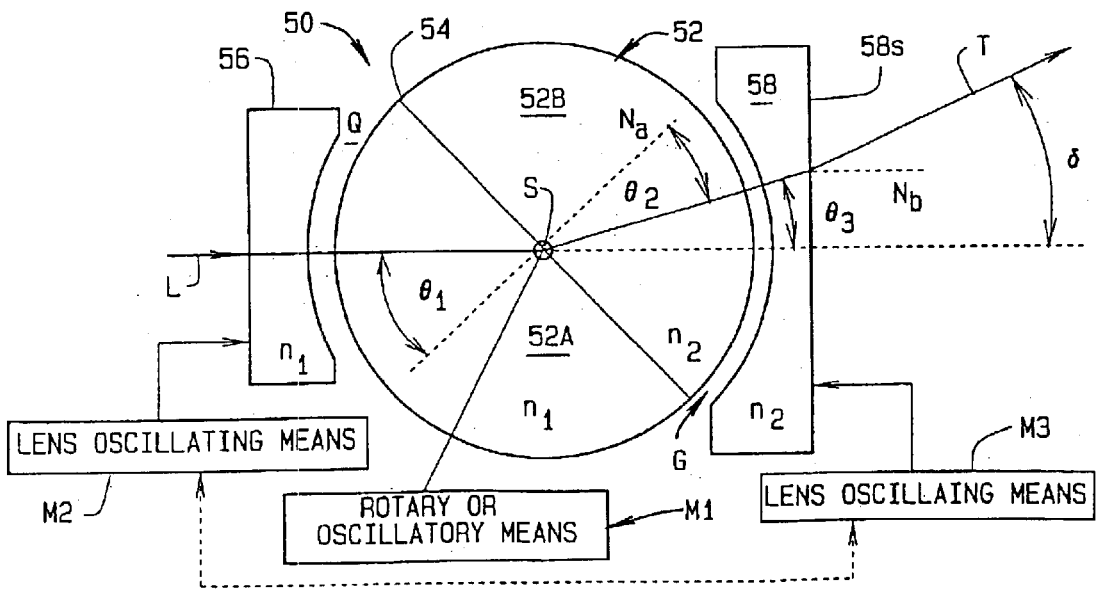
FIG. 3 is a representation of an in-line beam scanner employing a dynamically balanced bi-index rotating element for two-dimensional scanning.

Referring to FIG. 3, a beam steerer/scanner 50 of the present invention comprises an optical scanning element 52 that is dynamically balanced, but optically unbalanced. Importantly, element 52 has two modes of operation, oscillatory or rotary. Element 52 can comprise a right circular cylinder, or a sphere. Regardless of the shape of the optical element, it is constructed of two symmetric halves or sections 52A, 52B (one-half of a right circular cylinder, or a hemisphere) with a flat, planar interface 54 between them. A light beam L transmitted at device 50 is directed at optical element 52 through a first coupling lens 56, and the transmitted beam T from the element is directed through a coupling element 58 on the opposite side of the element. The two sections 52A, 52B of element 52 are of equal size and shape, and are made from two materials which are of equal density but which have different refractive indices. When the element is now oscillated or rotated, a transmitted beam L is deviated (steered) from its initial path, or scanned. Because the two materials forming the respective sections 52A, 52B are of equal density, the assembly may be oscillated or rotated at very high speeds (upwards of 1 kHz) without excessive vibration or stress.

In FIG. 3, the refractive indices of the two halves are not equal so that the refractive index $n_1$ for half 52A differs from index $n_2$ for half 52B. Any beam L transmitted through planar interface 54 of will be deviated by the difference in refraction, in accordance with Snell's Law. Those skilled in the art will also appreciate that a slight amount of reflection also occurs at interface 54. AR coatings may be applied to minimize this reflection. The following Table lists several transparent glass and crystal materials that meet the dual criteria of differing in refractive index, but not differing in density. Plastic materials having similar characteristics can also be used.

In the table, "n" is the refractive index, ρ is the density, α is the thermal expansion coefficient, $n_h/n_l$ is the ratio of the higher refractive index to the lower refractive index and is a measure of the maximum deviation available, and the approximate wavelength range for which the material is transparent is also given in μm. The glass data is taken from the Schott Glass Catalog. The crystal data is taken from Chapter 33 of the Handbook of Optics II, McGraw-Hill, Inc., 1995.

TABLE

| | Index of Refraction (n) | ρ (g/cm³) | α (×10⁶) | $n_h/n_l$ | Transparency Range (μm) |
|---|---|---|---|---|---|
| Glasses | | | | | |
| FK51 | 1.486 | 3.73 | 13.6 | 1.111 | ~0.4–2.0 |
| LaKN22 | 1.651 | 3.73 | 6.6 | | |
| PK51 | 1.528 | 3.97 | 13.1 | 1.111 | ~0.4–2.0 |
| BaSF13 | 1.698 | 3.97 | 7.1 | 1.111 | |
| KF6 | 1.517 | 2.67 | 6.9 | 1.069 | ~0.4–2.0 |
| FN11 | 1.626 | 2.66 | 7.5 | | |
| FK52 | 1.486 | 3.64 | 14.4 | 1.094 | ~0.4–2.0 |
| F1 | 1.626 | 3.65 | 8.7 | | |
| Crystals | | | | | |
| LaF3 | 1.59 | 5.94 | 16/11 | 1.314 | 0.38–6.0 |

TABLE-continued

| | Index of Refraction (n) | ρ (g/cm³) | α (×10⁶) | $n_b/n_1$ | Trans- parency Range (μm) |
|---|---|---|---|---|---|
| Cubic Zirconia | 2.09 | 5.94 | 10 | | |
| CuCl | 1.97 | 4.14 | 14.6 | 1.523 | 0.54–10.5 |
| GaP | 3.0 | 4.13 | 4.3 | | |
| GaAs | 3.3 | 5.32 | 5.0 | 1.212 | 1.8–15 |
| Ge | 4.0 | 5.33 | 5.7 | | |
| CuCl | 1.97 | 4.14 | 14.6 | 1.574 | 0.8–12.5 |
| ZnGeP₂ | 3.1 | 4.14 | 7.8/5 | | |
| β-ZnS | 2.26 | 4.09 | 6.8 | 1.327 | 0.54–10.5 |
| GaP | 3.0 | 4.13 | 5.3 | | |
| ZnSe | 2.4 | 5.26 | 7.1 | 1.667 | 1.8–15 |
| Ge | 4.0 | 5.33 | 5.7 | | |

Referring to the Table, refractive scanners are especially effective in the infrared region of the spectrum, where higher refractive index materials are available. This region is of particular interest for laser radars and biological and chemical sensing applications.

Element 52, which may be either spherical or cylindrical, rotates or oscillates about its own axis S, which, in FIG. 3 is perpendicular to the plane of the paper. A means M1 is provided for rotating or oscillating the optical element about this axis, which is perpendicular to the direction of beam L. Those skilled in the art will understand that means M1 can be affected in a number of ways without departing from the scope of the invention. Among these include: electrical, electronic or electrostatic, pneumatic or hydraulic, and manual or other mechanical or electromechanical means such as stepper motors.

Beam L deviates up or down in the plane of the paper from the rotational movement of element 52. The beam enters from the left (as viewed in FIG. 3) and is guided into and out of the element 52 by the plano-concave lenses comprising coupling lenses 56 and 58 which installed in close proximity to, but spaced from, the optical element. The radius of curvature of the concave surfaces of these lenses matches the radius of element 52. Coupling lens 56 has a refractive index $n_1$ that matches that of the hemisphere, or hemi-cylinder, 52A comprising one-half of element 52. This minimizes any deviation at the curved surfaces of the lenses and element 52 for off-axis beams impinging on the device. Further, the diameter of lens 56 must be at least as large as the diameter of beam L. The other coupling lens 58 has a refractive index $n_2$ that matches that of the other hemisphere, or hemi-cylinder, 52B. The diameter of lens 58 must be larger than that of lens 56, to avoid vignetting or clipping beam L when it is deviated from its original direction. Thus, as shown in FIG. 3, lens 58 is larger in size than lens 56. For dynamic stability, or to reduce the number of different parts required in fabricating beam steerer 50, both lenses 56 and 58 may be the same size, typically the size of lens 58. Further, one of the coupling lenses can be made of a material, which achromatizes device 50 so to minimize deviation errors in beam L due to changes in color or wavelength.

For low speed oscillatory applications, a gap G between the respective lenses 56, 58 and element 52 may be filled with a low viscosity, transparent liquid Q that matches the refractive index of the components it contacts. The liquid eliminates reflective losses, beam displacement and deviation from the curved surfaces, but also slows the scanner's maximum speed. For high speed applications, gap G is filled with air so to form an air bearing, or is filled with a vacuum, and the surfaces of the coupling lenses and element 52 maybe AR coated to reduce reflections at the material/air interfaces.

In FIG. 3, dashed line $N_a$ is normal to interface 54 of element 52, and dashed line $N_b$ is normal to a plane surface 58s of coupling lens 58. Angles $\theta_1$, $\theta_2$ and $\theta_3$ are, respectively, angles of incidence at the interface between the sections 52A and 52B of element 52, the angle of refraction at interface 54, and the angle of incidence at surface 58s of lens 58. A null position, at which beam L is undeviated corresponds to $\theta_1=0$, which condition occurs when interface 54 of element 52 is vertical in the embodiment of FIG. 3.

In some applications, surface 58s of lens 58 may be a curved rather than flat surface to alter the deviation of beam steerer 50. A convex lens surface 58s will reduce the range of deviation attainable by the beam steerer. Conversely, a concave surface 58s will increase the deviation range. An acylindrical surface 58s affects the linearity of a beam scan as a function of time.

The transmitted beam T from steerer 50 is also refracted/ deviated at surface 58s of lens 58. For a given angel $\theta_1$, the angle $\theta_2$ is calculated from Snell's Law (Eq. 1), as;

$$n_1 \sin \theta_{1-n2} \sin \theta_2 \quad \text{Eq. 1}$$

The deviation δ of transmitted beam T is a function of the angular position of the element 52; i.e., angle $\theta_1$, and is given by Eq. 2, as:

$$\delta = \arcsin\{n_2 \sin (\theta_1-\theta_2)\} \quad \text{Eq. 2}$$

Figure 4:
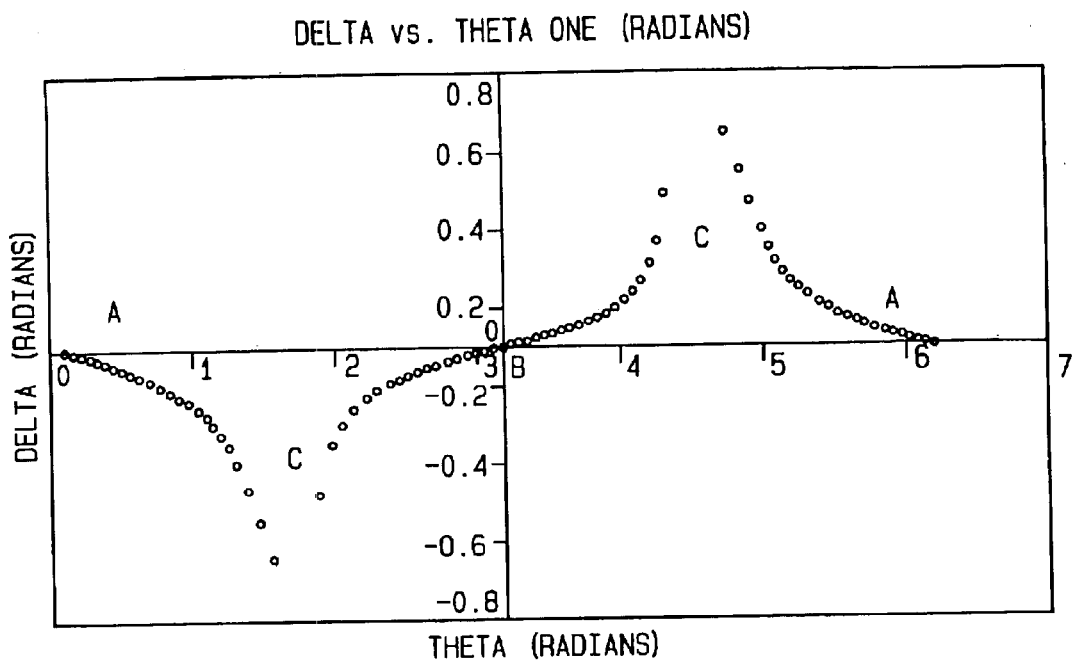
FIG. 4 is a plot of the deviation of a transmitted beam through the device of FIG. 2 versus rotational position.

Referring to FIG. 4, a plot of this function δ, $\theta_1$ is made for the condition where $n_1=1.517$, and $n_2=1.621$. The maximum deviation range in this example is approximately 1.2 radians (68°) or +/−0.6 radians (34°). The null, undeviated position ($\theta_1=0°$) is at the far left and far right of the graph. Another null occurs in the center of the graph, where element 52 has rotated π radians or 180°.

In FIG. 4, for rotational values of element 52, where $2.54<\theta_1<3.74$ radians, and where 5.68 (or −0.60)$<\theta_1<0.60$ radians, deviation δ is less than +/−0.07 radians (+/−4°) and is approximately linear as a function of $\theta_1$. Since most drives, however, do not produce a linear relationship between $\theta_1$ and time, the actual behavior of the scanned beam on a screen or other target is generally a more complicated function with respect to time.

To achieve the highest possible scanning speeds, element 52 is rotated at speeds of 6,000 rpm or greater. During certain portions of the rotation of element 52, beam L undergoes a total internal reflection within the element, and there will be no transmitted beam T. These regions are indicated C in FIG. 4, and correspond approximately to, $1.40<\theta_1<1.49$ radians and $4.52<\theta_1<4.61$ radians. The period of this zero transmittance is less than 10% of a complete rotation of element 52. While this does place a limit on the efficiency of scanner 50, in many high-speed applications the resulting slight drop in efficiency is acceptable. At slower scanning speeds, element 52 is oscillated in the same manner as commercially available galvanometer scanning mirror systems are oscillated. This has the advantage that beam L is always transmitted. These scanning ranges are represented in FIG. 4 as −1 (5)$<\theta_1<+1$ radians and designated as the regions A, or $2.14<\theta_1<4.14$ radians, which is the region designated B.

A beam steerer/scanner of the present invention, such as shown in FIG. 3, offers significant advantages over conventional beam steerers or beam scanners. First, the scanner has a simple in-line, drop-in, design that saves space, weight and cost. The unit provides large clear apertures in a constrained space, such as a missile dome. There are no blind spots within the field of view, and the unit does not displace the center-of-scan from the original beam axis. The device will scan an electromagnetic beam symmetrically about the original beam axis, and will scan the transmitted beam with little loss of beam energy. It also has a scanning capability of 1 kHz, which enables an electromagnetic beam to be scanned more rapidly than has heretofore been practical. A portion of the transmitted or reflected beam L may be used as a timing signal. As a beam steerer, the unit acts to rapidly switch electromagnetic beams from one position to another, and the device can also be used in optical fiber systems by acting as a switch for light transmitted through optical fibers. In addition to rotation of optical element 52 by means M1, coupling lenses 56 and 58 can also be moved with respect to beam L. In FIG. 3, lens 56 is movable by a means M2, and lens 58 by a means M3. The lenses are separately movable, or they can be moved in unison as indicated by the dashed line between means M2 and M3. Movement of one or both of the coupling lenses 56, 58 may be used to alter the one-dimensional scan produced by rotation or oscillation of the dynamically balanced bi-index element 52 or to add scanning in the orthogonal direction to make a two-dimensional scanner. In either case the motion of the coupling lens(es) 56, 58 is a rotation about the center S of the dynamically balanced bi-index element 52.

In FIG. 3, the movement of the coupling lens(es) to alter the one-dimensional scan will be in the plane of the paper. That is, any position within a coupling lens 56, 58 will oscillate along a circular arc in the plane of the paper, centered at the center S of the dynamically balanced bi-index element 52. In FIG. 3, the movement of the coupling lens(es) 56, 58 to produce a two-dimensional scanner will be in a plane perpendicular to the paper and through beam L axis. That is, any position within the coupling lens(es) 56, 58 will oscillate along a circular arc in a plane perpendicular to the paper and through the incident beam (L) axis.

Figure 5:
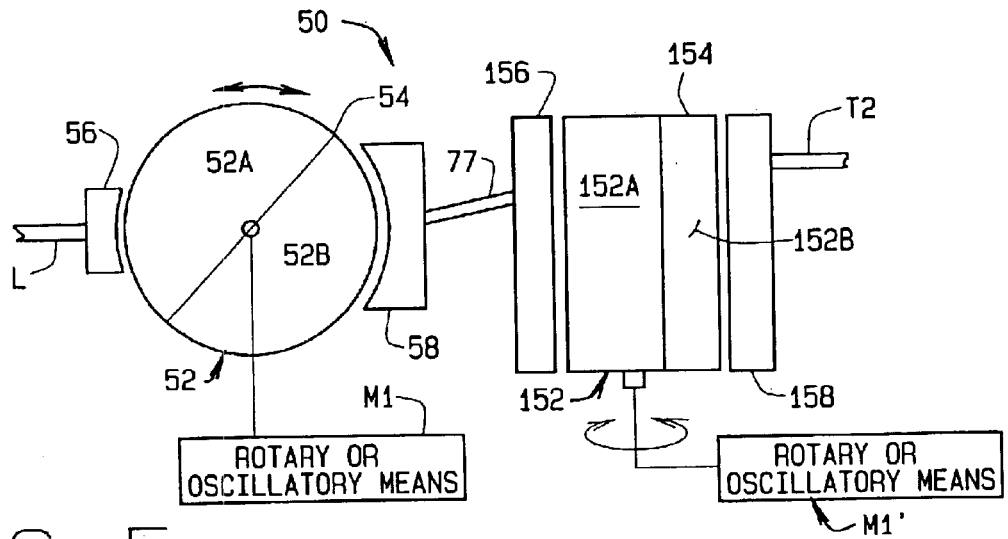
FIG. 5 is an embodiment of the beam scanner providing a two-dimensional deviation by combining two one-dimensional scanners in parallel.

Next, those skilled in the art will understand that two dynamically balanced bi-index rotating elements 52 can be combined in parallel to produce two-dimensional scanners. This is shown in FIG. 5. In FIG. 5, a scanner 150 includes the optical element 52, lens 56, 58 construction previously described. Now, a record optical element 152 with sections, 152A, 152B, interface 154 between the sections, and associated couplings 156, 158 is identically formed to the previously described optical element and coupling lenses. This second optical element and coupling lenses are located downstream of the previously described components and installed so to rotate on an axis 90° from that of optical element 52. Rotary or oscillatory movement of optical element 152 is by a means M1'. Now, a scanned beam L results in a transmitted beam T1 which is scanned in one dimension. When beam T1 is directed through optical element 152, it results in a transmitted beam T2 that is now scanned in the orthogonal dimension.

Alternatively, a spherical rotating element 52 can be used with one or both of the coupling lenses 56, 58 being oscillated about an orthogonal axis (which extends through the center of rotating element 52) to produce a scan orthogonal to that of element 52. When oscillated about the center of the rotating element, coupling lenses 56, 58 have a moment of inertia larger than the moment of inertia of element 52 when rotating about its own axis. Accordingly, the lenses are not capable of speeds as high as those of element 52. Often, however, this is not a problem. For example, in raster scanning, a higher scanning speed is usually required only in one direction.

Figure 6:
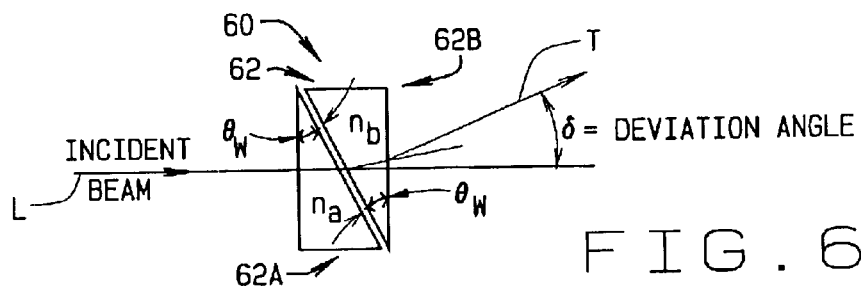
FIG. 6 is a representation of an embodiment of a beam scanner of the present invention employing wedges.

Referring to FIG. 6, a beam steerer/scanner 60 of the present invention comprises an optical scanning element 62 that is dynamically balanced, but optically unbalanced. Element 62 is constructed of two circular wedges 62A and 62B, with the same wedge angle $\theta_w$, combined such that the outer plane surfaces are parallel with each other. Elements 62A and 62B are constructed of two different materials that have substantially the same density, but substantially different refractive indices. Because of the equal densities and symmetric shapes, wedge 62 may be rotated about an axis through its center and perpendicular to the outer flat surface at high speeds without excessive vibration or stress. Said rotation sweeps the transmitted beam around the surface of a cone with half-angle $\delta$ and its apex near the interface between elements 62A and 62B. A second beam steerer/scanner of similar design may be added to direct the beam approximately anywhere within a cone angle of $2\delta$, as is well known to those skilled in the art. Counter rotation of two similar beam steerer/scanners can result in an approximately straight-line scan. Two such counter rotated pairs of beam steerers/scanners can result in approximately orthogonal or 2-dimensional Cartesian scanning.

In view of the above, it will be seen that the several objects and advantages of the present invention have been achieved and other advantageous results have been obtained.

What is claimed is:

1. A device (50) for steering an incident electromagnetic beam (L) from its original path to produce a deviated beam (T) transmitted at an angle ($\delta$) from its original path, comprising:

an optical element (52) that is dynamically balanced but optically unbalanced, the optical element being comprised of at least two identically formed sections (52A, 52B) each of which are made of different materials, the materials forming the respective sections being substantially equal in density, but having significantly different indices ($n_1$, $n_2$) of refraction, so to produce deviation of the beam when the optical element is rotated or oscillated about an axis (S) of movement; and, means (M1) for rotating or oscillating the optical element about its axis.

2. The device of claim 1 further including a coupling lens (56) interposed between the incident beam and the optical element, and a coupling lens (58) interposed between the optical element and an output of the device.

3. The device of claim 2 in which at least one coupling lens comprises a plano-concave lens.

4. The device of claim 3 in which a curvature of a concave surface of at least one lens corresponds to that of an outer surface of the optical element (52).

5. The device of claim 2 in which the index of refraction of each coupling lens corresponds to that of the section of the optical element to which it is adjacent, so to minimize any deviation of the beam at the curved surfaces of the lenses and the optical element.

6. The device of claim 5 in which one of the coupling lenses is made of a material which achromatizes the device so to minimize deviation in a beam due to color or wavelength.

7. The device of claim 2 in which a diameter of the coupling lens (58) interposed between the optical element and an output of the device, is larger than the diameter of the coupling lens (56) interposed between the incident beam and the optical element, so to prevent vignetting.

8. The device of claim 2 further including means (M2, M3) for moving at least one of the coupling lenses.

9. The device of claim 8 in which the coupling lenses are separately movable by their respective moving means.

10. The device of claim 2 in which an outer surface (58s) of the coupling lens (58) interposed between the optical element and the output of the device is a convex lens surface, which reduces the range of deviation attainable by the device.

11. The device of claim 2 in which an outer surface (58s) of the coupling lens (58) interposed between the optical element and the output of the device is a concave lens surface which increases the range of deviation attainable by the device.

12. The device of claim 2 in which an outer surface (58s) of the coupling lens (58) interposed between the optical element and the output of the device is an acylindrical surface which effects linearity of a scanned beam (T).

13. The device of claim 2 in which additional concave components with curvature nominally matching the curvature of the optical element are placed in close proximity to the optical element to stabilize its rotational movement.

14. The device of claim 1 in which the optical element comprises a right circular cylinder with each section comprising one-half of the cylinder.

15. The device of claim 1 in which the optical element comprises a sphere with each section comprising a hemisphere.

16. The device of claim 1 in which each section forming the optical element comprises an optical wedge and the axis (S) of movement is parallel to the incident light beam (L).

17. The device of claim 1 in which the materials from which the sections are formed have substantially equal coefficients of thermal expansion.

18. The device of claim 1 further including a second optical element (152) operating with the first said optical element so to provide a two-dimensional scanning device (150).

* * * * *